United States Patent [19]

Takei

[11] Patent Number: 5,357,819
[45] Date of Patent: Oct. 25, 1994

[54] DRIVE APPARATUS

[75] Inventor: Seiji Takei, Kanagawa, Japan

[73] Assignee: Nippon Thompson Co., Ltd., Tokyo, Japan

[21] Appl. No.: 993,624

[22] Filed: Dec. 21, 1992

[30] Foreign Application Priority Data

Dec. 24, 1991 [JP] Japan .................. 3-355623

[51] Int. Cl.⁵ .............................................. F16H 19/02
[52] U.S. Cl. .................................. 74/89; 74/479 PH; 108/20; 108/143; 476/8; 476/67; 384/45
[58] Field of Search .......... 74/89, 89.17, 422, 479 PH; 476/8, 67; 108/20, 143; 384/45

[56] References Cited

U.S. PATENT DOCUMENTS

| | | | |
|---|---|---|---|
| 2,540,738 | 2/1951 | Kaplowitz | 476/65 X |
| 2,817,243 | 12/1957 | Dean | 476/8 X |
| 3,436,972 | 4/1969 | Small | 74/89 |
| 3,901,162 | 8/1975 | Bertin | 74/422 X |
| 4,189,953 | 2/1980 | Volk | 108/143 X |
| 4,248,101 | 2/1981 | Santoro | 74/89 X |
| 4,296,648 | 10/1981 | Okano et al. | 476/8 X |
| 4,378,709 | 4/1983 | Chitayat | 108/143 X |
| 4,550,626 | 11/1985 | Brouwer | 74/422 X |
| 4,552,033 | 11/1985 | Marzhauser | 108/143 X |
| 5,067,477 | 11/1991 | Santangelo | 74/422 X |

Primary Examiner—Allan D. Herrmann
Attorney, Agent, or Firm—Sughrue, Mion, Zinn, Macpeak & Seas

[57] ABSTRACT

The present invention provides a drive apparatus that is compact in size, low in cost, allows the attaining of a high degree of accuracy as well as high-speed driving, and suppresses the production of noise.

The present invention is composed so that a drive roller rolls along a track rail as a result of providing a torque generation device on a slider guided by said track rail, and attaching the output shaft of said torque generation device to said drive roller.

13 Claims, 18 Drawing Sheets

DRIVE APPARATUS

BACKGROUND OF THE INVENTION

1. Field of the Invention

The present invention relates to a drive apparatus for moving a certain object (driven object) in a desired direction.

2. Description of the Prior Art

An example of the prior art having this type of drive apparatus is the XY table indicated in FIG. 1.

As indicated in FIG. 1, said XY table is comprised of X table 1 installed on the floor or a mounting frame in a workshop, and Y table 2 moved by said X table 1. Furthermore, as X table 1 and Y table 2 have nearly the same constitution, the following detailed explanation will be provided with respect to X table 1 only, with an explanation of Y table 2 omitted. However, those constituent members of Y table 2 that correspond to the constituent members of X table 1 are indicated using the same reference numerals. Furthermore, an exploded view of the constituent members of X table 1 divided into suitable blocks is indicated in FIG. 2.

As indicated in FIG. 1, X table 1 has a long, roughly rectangular plate-shaped base 5, and side plate 6, provided on said base 5 and forming a box with said base 5. Motor 7 is mounted on one end of this side plate 6. In addition, as is indicated in FIG. 2, pulley 9 is fit onto output shaft 7a of motor 7. In addition, another pulley 10 is arranged on base 5, and is mounted to base 5 by means of brackets not shown. Endless belt 12 is wrapped around pulleys 9 and 10. A driven object the form of moving table 13 is fastened to this belt 12.

As indicated in the drawings, moving table 13 has a prescribed thickness and is composed to be of a size that allows it to be contained within the width of side plate 6. Two table projections 13a projecting above the upper surface of side plate 6 are provided in parallel on the left and right sides. These table projections 13a may be formed into an integrated structure with moving table 13 or may be composed in the form of separate structures. Above-mentioned Y table 2 is mounted on the upper surface of said table projections. Furthermore, cover 15 is arranged to the inside of these table projections 13a, acting to prevent entrance of dust and so on.

A driving device that drives belt 12 is comprised of the above-mentioned motor 7, pulley 9 and pulley 10.

On the other hand, as is indicated in FIG. 2, a pair of linear motion rolling guide units 17 are mutually arranged in parallel on the right and left sides of the above-mentioned belt 12, and are mounted on base 5. These linear motion rolling guide units 17 receive the load in all four directions (the directions indicated by arrows Z and Y as well as their respective opposite directions) applied to moving table 13, and also act as guiding devices that guide moving table 13. The drive apparatus that moves moving table 13, the driven object, is composed of these linear motion rolling guide units 17 and the above-mentioned belt 12 and its driving device.

More specifically, linear motion rolling guide unit 17 is composed of track rail 18, roughly in the shape of a square column, in which ball track rail groove 18a, having a cross-section in the shape of a semi-circle, is formed in the left and right shoulders of the side wall, slider 20, having a cross-section roughly in the shape of the letter "U", in which ball track rail groove 20a, having a semicircular cross-section, is formed in its inner surface in opposition to ball track rail groove 18a of track rail 18, and flat plate-shaped retainers (not shown), arranged at equal intervals in the mutual sliding direction between ball track rail grooves 18a and 20a, and holding the balls while allowing rotation. Furthermore, linear motion rolling guide units 17 are not limited to the use of balls, but may also use other devices such as rollers as long as they are of a constitution that uses a rolling object.

The following provides an explanation of the operation of the XY table having the above-mentioned constitution. Furthermore, as X table 1 and Y table 2 have the same constitution as described above, the following explanation will deal primarily with X table 1.

Firstly, when a power voltage is supplied to motor 7 of X table 1, output shaft 7a of motor 7, serving as the driving source, rotates which transmits torque to pulley 9. Then, belt 12, wrapped around pulley 9 and pulley 10, is driven in a prescribed direction, and moving table 13, mounted on the upper surface of this belt 12, also moves guided by linear motion rolling guide unit 17. Conversely, when the direction of rotation of motor 7 is reversed, belt 12 is driven in the opposite direction from that above, and consequently, moving table 13 also moves in that direction. In addition, the movement of moving table 13 is controlled by a control circuit comprised of a microcomputer and so on. A detector, which outputs a position detection signal to this control circuit, is composed to be able to be mounted to the inside of side plate 6 indicated in FIG. 1, and on the upper surface of base 5. In addition, detection may also be performed by an encoder mounted behind motor 7.

In addition, since Y table 2 is mounted on table projections 13a of moving table 13 equipped on X table 1, it moves in the X direction which is the same direction as moving table 13 of X table 1. As moving table 13 of Y table 2 is composed so as to be able to independently move linearly in the Y direction, by controlling these with a control circuit not shown, moving table 13 of Y table 2 can be moved in both the X and Y directions.

FIG. 3 indicates a second example of a drive apparatus of the prior art. This device can be incorporated in the XY table indicated in FIG. 1 in the same manner as the drive apparatus indicated as the first example of the prior art in FIG. 2.

As indicated in FIG. 3, said drive apparatus has long ball screw 26, provided in parallel with track rail 18 equipped with linear motion rolling guide unit 17, and attached at both ends to base 5 by means of bearings 25, motor 27 that rotates said ball screw 26, and nut member 28 engaging with ball screw 26 and mounted with respect to moving table 13, the driven object.

Furthermore, since the drive apparatus indicated in FIG. 3 is composed in the same manner as the first example of a drive apparatus of the prior art indicated in FIG. 2 with respect to portions other than those described above, an explanation of the entire apparatus will be omitted. In addition, in the above-mentioned explanation, the same reference numerals are used for those constituents that are identical to the constituents equipped on the first example of the prior art.

In said second example of a drive apparatus of the prior art, when ball screw 26 is driven to rotate by motor 27, moving table 13 moves together with nut member 28.

As described above, in addition to linear motion rolling guide unit 17 for guiding of the driven object, the drive apparatus of the prior art has a long component for transmission of driving force such as belt 12 or ball screw 26, motors 7 and 27 that serve as the driving source, and several other peripheral components, such as pulleys and bearings, related to these. Accordingly, this drive apparatus has the shortcomings of being large in size and having a large number of components resulting in high costs. In addition, since the driving force produced by motors 7 and 27, serving as the driving sources, is transmitted through numerous members, such as a long component for transmission of driving force, this drive apparatus has the additional shortcoming of it being difficult to attain a high degree of accuracy in movement and positioning of the driven object. Moreover, together with it not always being easy to attain high-speed driving with this drive apparatus, due to the large number of components operating relative to each other, this drive apparatus has the shortcoming of producing a relatively high level of noise.

SUMMARY OF THE INVENTION

In consideration of the above-mentioned shortcomings of the prior art, the object of the present invention is to provide a drive apparatus that is compact in size, low in cost, allows the attaining of a high degree of accuracy as well as high-speed driving, and suppresses the production of noise.

The present invention comprises: a track rail in which a track is formed along the axial direction; a slider guided by the above-mentioned track; a torque generation device mounted on the above-mentioned slider; and, a drive roller that rolls while engaging with the above-mentioned track rail by application of torque by the output shaft of the above-mentioned torque generation device.

DESCRIPTION OF THE PREFERRED EMBODIMENTS

The following provides a detailed explanation of a drive apparatus in the form of embodiments of the present invention with reference to the attached drawings.

Firstly, FIGS. 4 through 8 indicate a drive apparatus as a first embodiment of the present invention.

Figure 1:
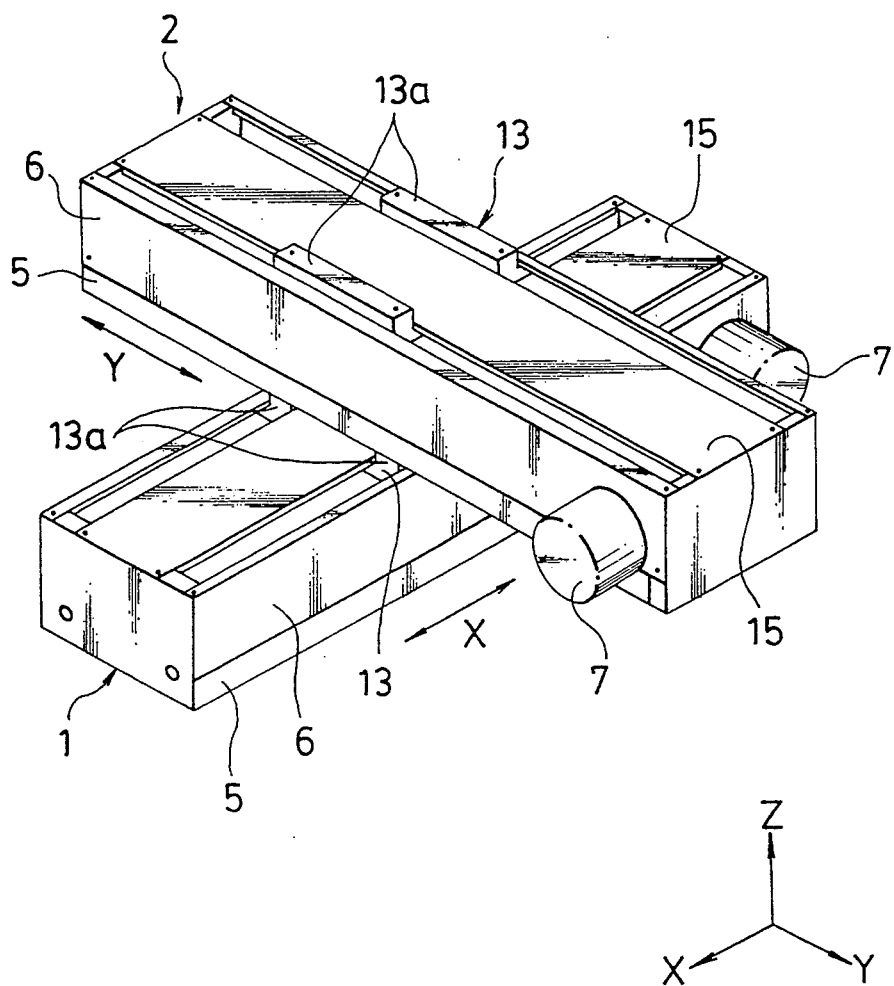
FIG. 1 is a perspective view of an XY table equipped with a drive apparatus of the prior art.
Figure 2:
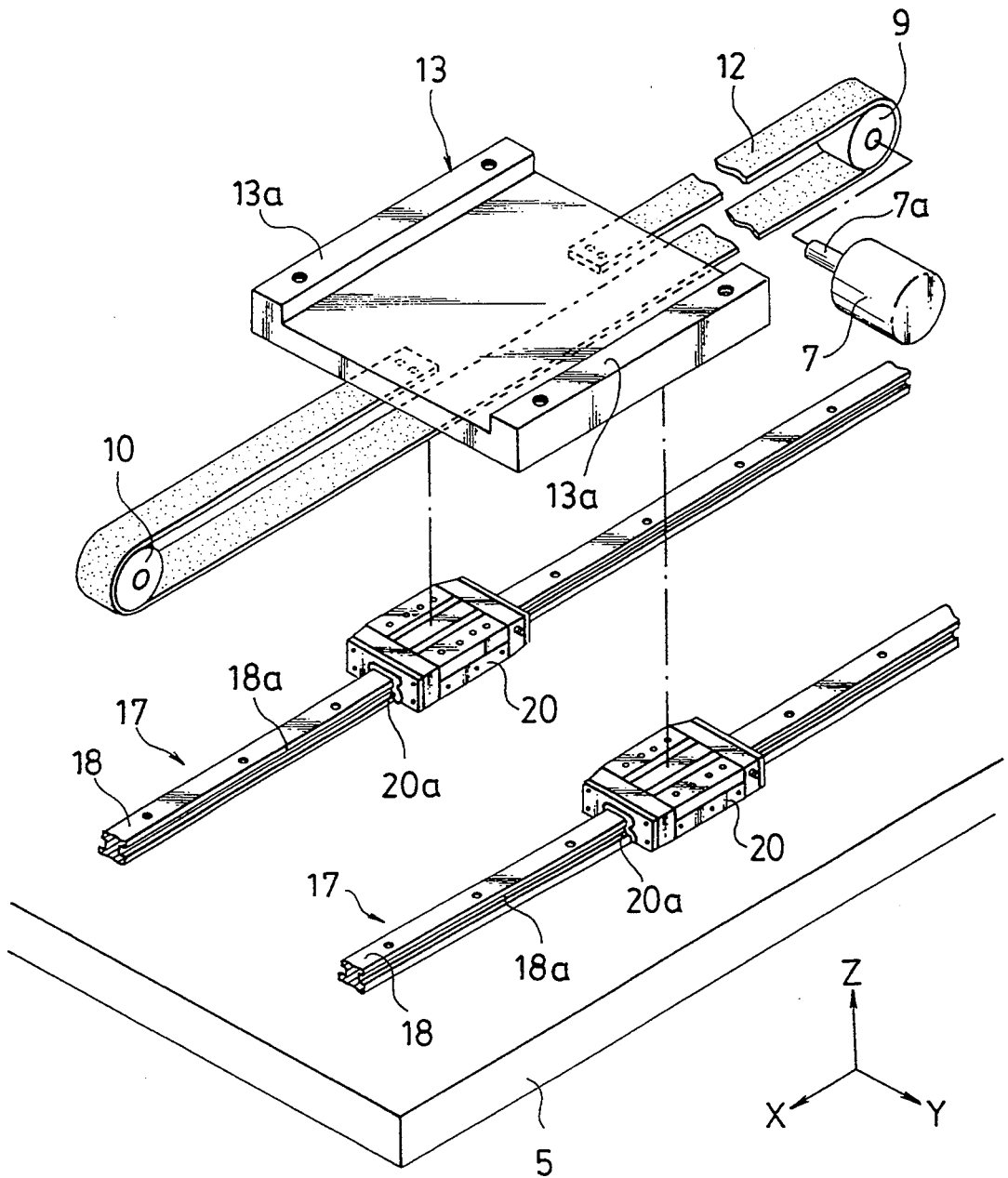
FIG. 2 is an exploded perspective view of a drive apparatus containing the XY table indicated in FIG. 1.
Figure 3:
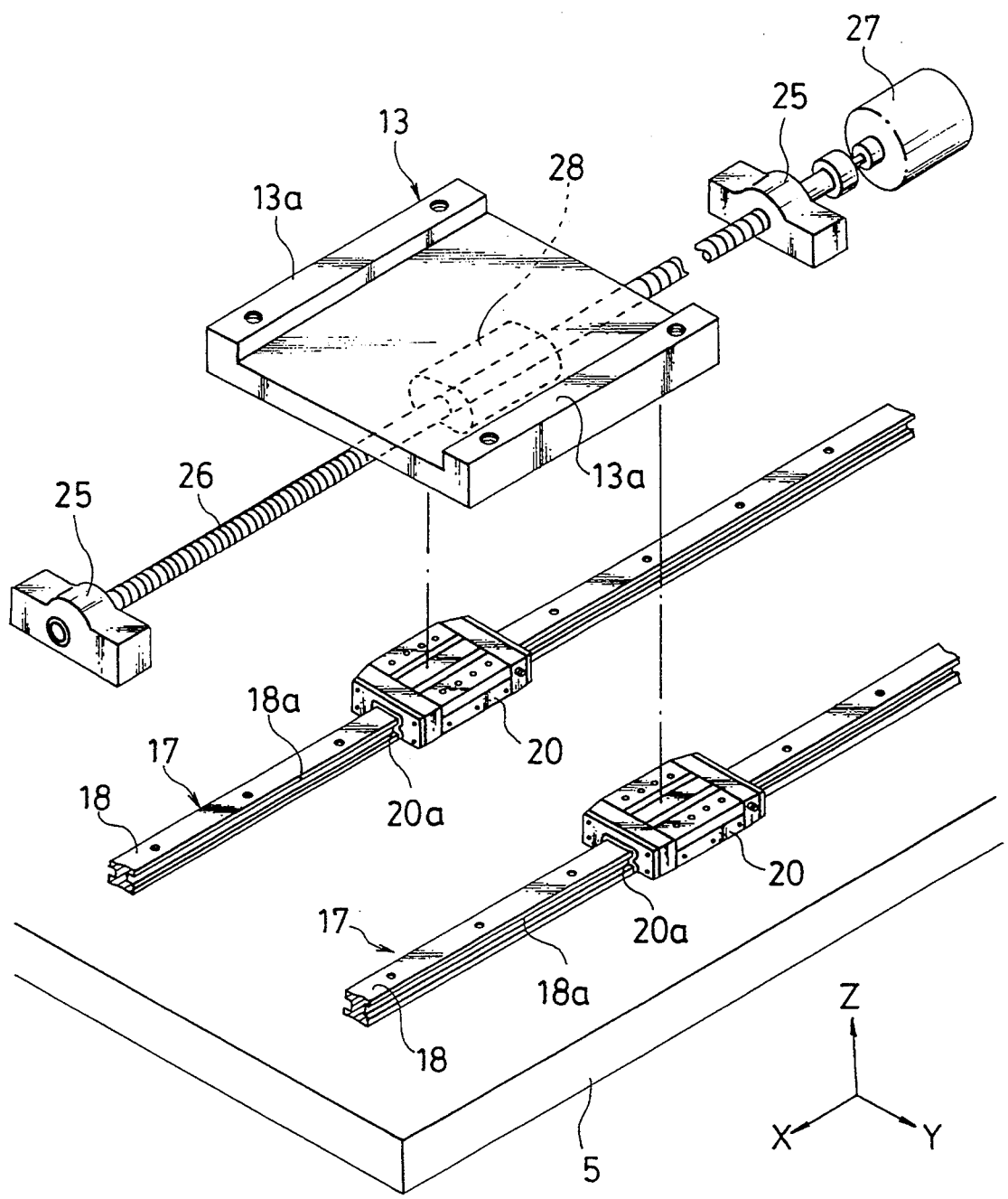
FIG. 3 is an exploded perspective view of a second example of a drive apparatus of the prior art.
Figure 4:
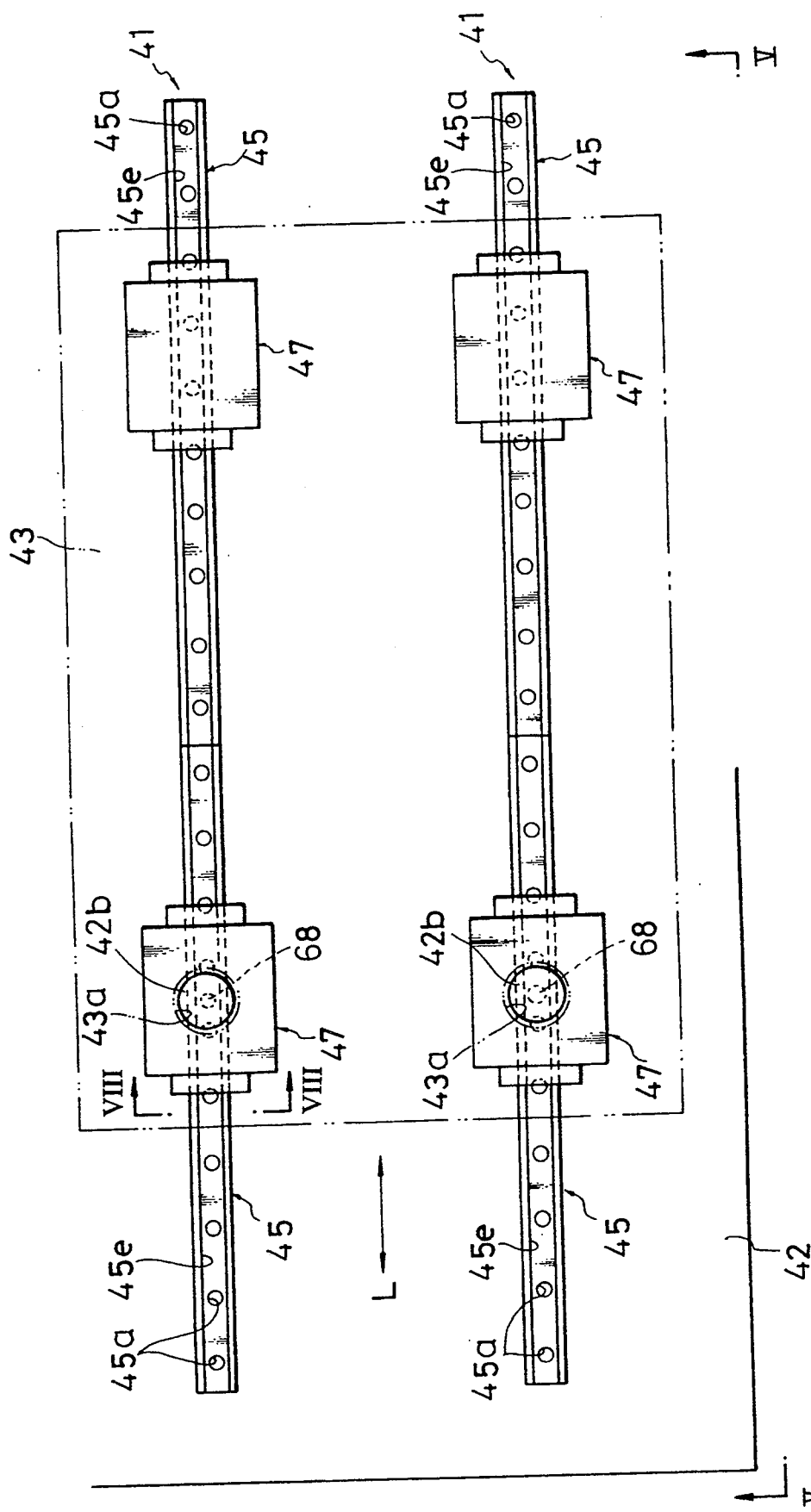
FIG. 4 is an overhead view indicating the drive apparatus of a first embodiment of the present invention mounted on the bed of a machine tool.
Figure 5:
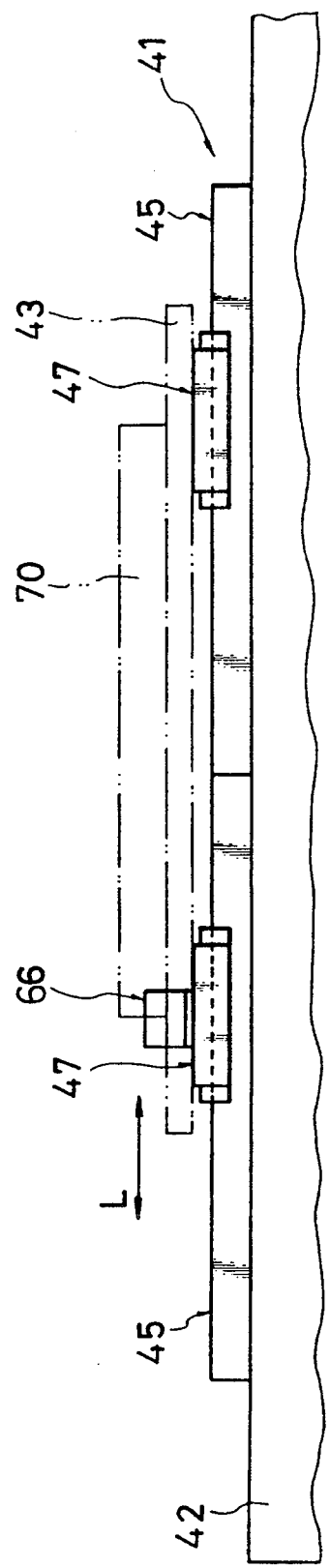
FIG. 5 is a view taken along arrows V—V relating to FIG. 4.

In FIGS. 4 and 5, two sets of this drive apparatus 41 are provided in parallel on a frame in the form of bed 42 of a machine tool (the entire machine tool is not shown), and support and move in concert with table 43.

Figure 6:
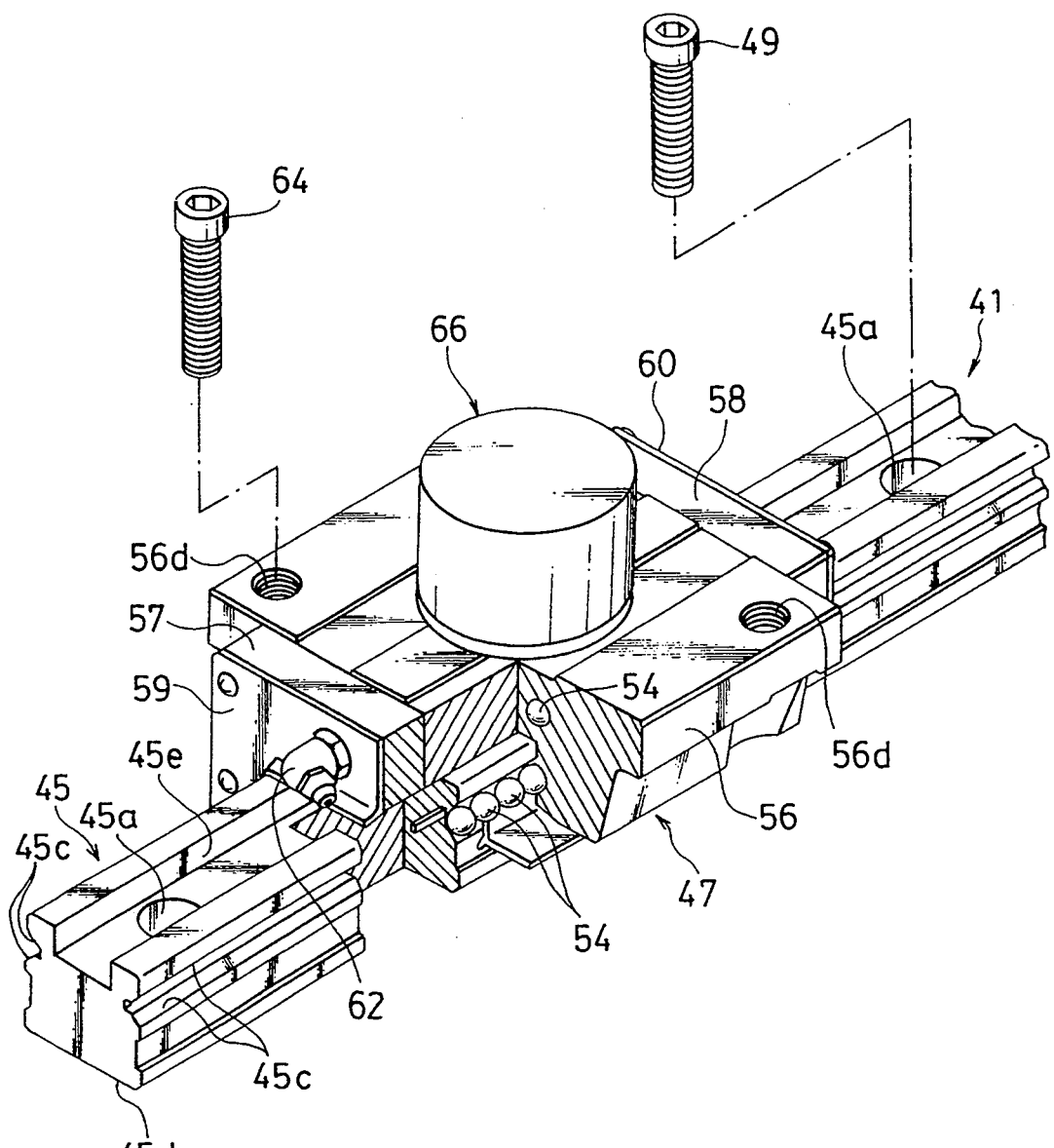
FIG. 6 is a perspective view, including a partial cross-section, of the essential components of the drive apparatus indicated in FIG. 4 and FIG. 5.

Both drive apparatuses 41 have two linear track rails 45 mounted in a single row on bed 42, and two slide units 47 in the form of sliders that are guided by said track rails 45. Furthermore, as indicated in FIG. 6, each track rail 45 is fastened to bed 42 by a plurality of bolts (with hexagon sockets) 49. More specifically, as is clearly indicated in FIGS. 7 and 8 in particular, countersunk portions 45a, having a diameter slightly larger than the heads of bolts 49 for fastening said track rail 45 to bed 42, and insertion holes 45b, having a diameter slightly larger than the threaded portions of bolts 49, are formed concentrically in track rail 45. Bolts 49 are screwed into bed 42 by being inserted into said countersunk portions and insertion holes so that they are completely embedded beneath the surface of said bed 42.

Figure 7:
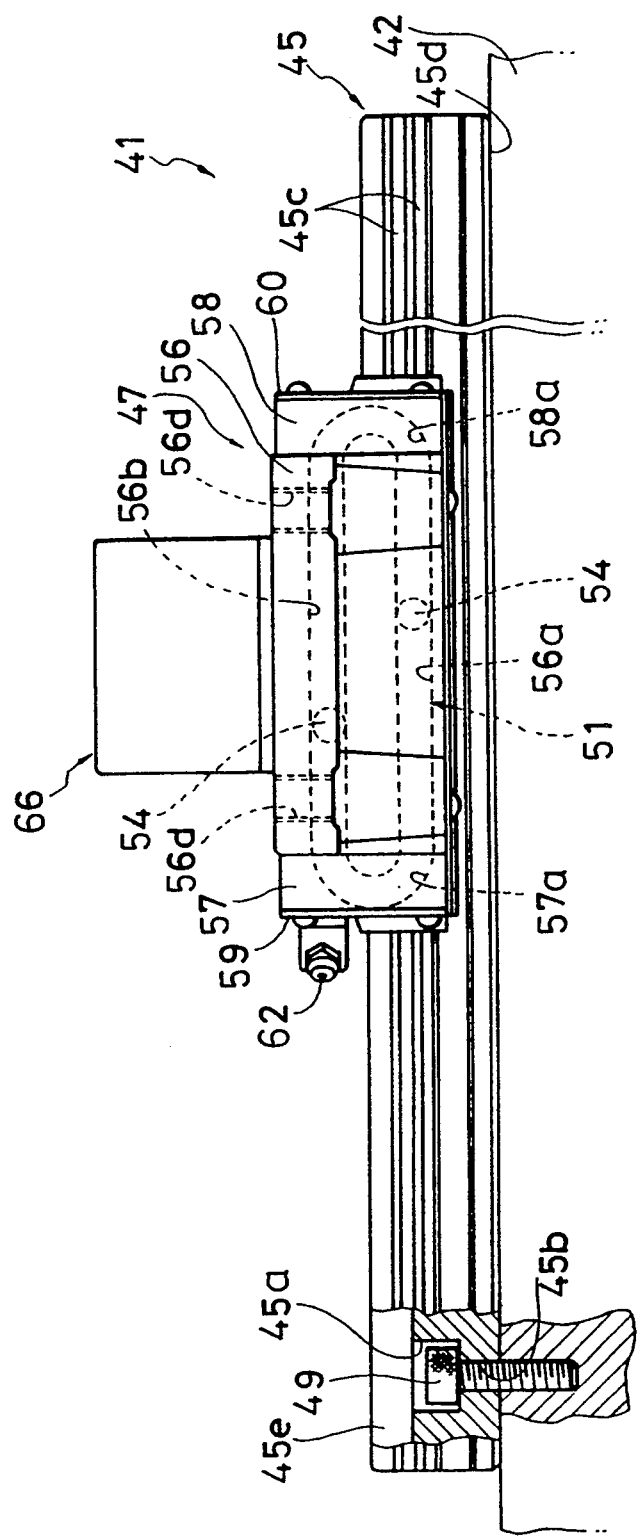
FIG. 7 is a side view, including a partial cross-section, of the essential components of the drive apparatus indicated in FIG. 4 and FIG. 5.
Figure 8:
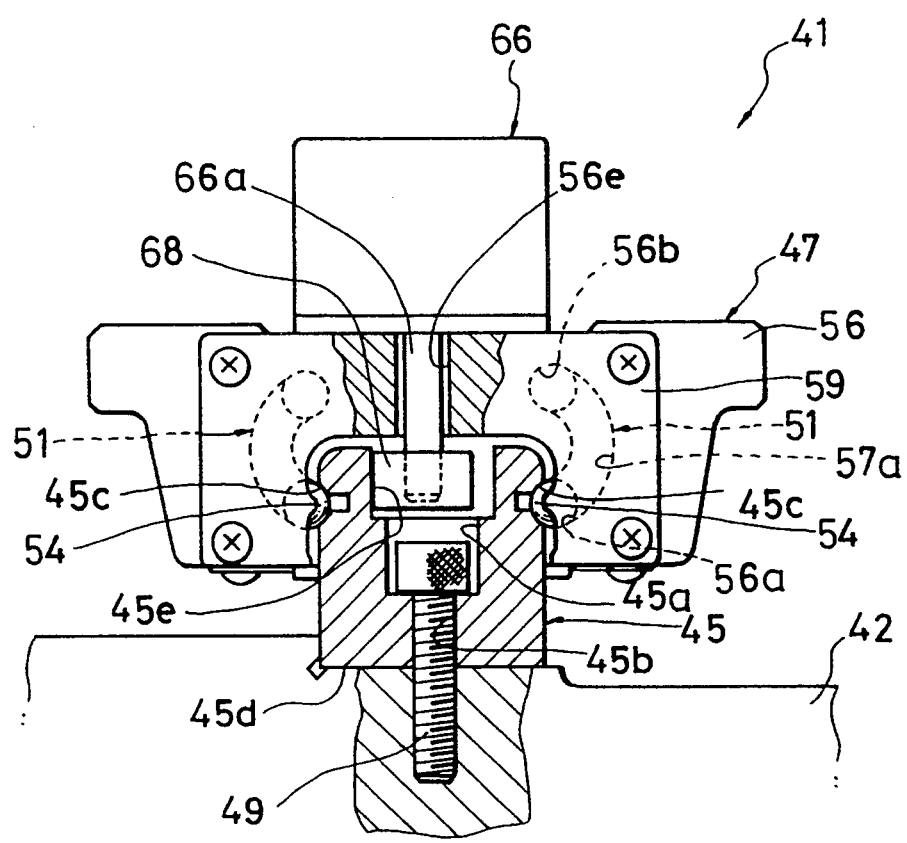
FIG. 8 is a view taken along arrows VIII—VIII, including a partial cross-section, relating to FIG. 4.

As is indicated in FIGS. 6 through 8, track rail 45 has a total of two tracks in the form of track grooves 45c, located on both sides of said track rail 45, that are formed along the axial direction of said track rail 45 having cross-sections roughly in the shape of a semi-circles. In addition, track rail 45 also has a flat mounting surface 45d on its bottom for fastening to bed 42. Slide unit 47 is straddled across this track rail 45, and as indicated in FIGS. 7 and 8, has two internal rolling element circulating paths 51 corresponding to each of the above-mentioned track grooves 45c. A plurality of rolling elements in the form of balls 54 are arranged and contained within these rolling element circulating paths 51. Each ball 54 rolls over track groove 45c accompanying movement of slide unit 47, thus resulting in circulation. As indicated in the drawings, slide unit 47 has casing 56, a pair of end plates 57 and 58 coupled to both the front and back ends of said housing 56, and two end seals 59 and 60 attached to the outside surface of each said end plate. Above-mentioned rolling element circulating path 51 is composed of load bearing track groove 56a and return path 56b, each formed linearly and in parallel with each other in casing 56, and a pair of roughly semi-circular directional change paths 57a formed in both end plates 57 and 58 that connect said load bearing track groove 56a and return path 56b at both of these ends. Furthermore, a grease nipple 62 is attached on end plate 57 for supplying grease to the surface of the above-mentioned balls 54. In addition, as indicated in FIGS. 6 and 7, a plurality of threaded holes 56d are formed in the upper side, or in other words the supporting side, of casing 56 of slide unit 47. Table 43, indicated in FIGS. 4 and 5, is then fastened to said casing 56 by bolts (with hexagon sockets) 64 screwed into these threaded holes.

However, as indicated in FIGS. 4 through 8, motor 66 is mounted as a torque generating device in the center of the upper side of casing 56 of slide unit 47. As is clear from FIG. 8, this motor 66 is attached so that its output shaft 66a is perpendicular to mounting surface 45d of track rail 45, and in this case, facing downward. As a result of motor 66, which is relatively heavy, being arranged on the upper surface of slide unit 47 in this manner, the moment applied to slide unit 47 can be held to a low level based on the weight of motor 66. This is desirable in terms of ensuring highly accurate operation of slide unit 47. Furthermore, as is indicated in FIG. 4, since motor 66 is provided on the upper surface, or in other words the supporting surface that holds table 43, of slide unit 47, motor 66 is inserted into through hole 43a formed in table 43 to prevent interference between motor 66 and said table 43.

As indicated in FIG. 8, output shaft 66a of motor 66 protrudes below the bottom of casing 56 through through hole 56e formed in said casing 56 of slide unit 47. Cylindrical drive roller 68 then fits onto this protruding portion. Furthermore, this drive roller 68 is also indicated in FIG. 4.

On the other hand, as is indicated in FIG. 4, FIG. 6 and FIG. 7, track surface 45e is formed in the top of track rail 45 in parallel with track grooves 45c, equipped on said track rail 45, to allow rolling by engaging with the above-mentioned drive roller 68. More specifically, a single, rectangular groove is formed in the upper portion, or top, of track rail 45. One of the inside surfaces of this groove is track surface 45e. Thus, since this constitution allows drive roller 68 to roll across the inside surface of the groove in the form of track surface 45e, drive roller 68 is able to roll smoothly and free of obstruction without making contact with countersunk portions 45a formed in track rail 45 for insertion of bolts.

A prescribed amount of oil is constantly supplied to the above-mentioned track surface 45e. Accordingly, an film (not shown) is formed between drive roller 68 and said track surface 45e. Consequently, slide unit 47 is propelled by means of the resistance, or in other words traction, that occurs when the oil film is sheared by the rotation of drive roller 68. Furthermore, although a traction drive system is employed in the subject embodiment, a so-called friction drive system may also be employed in which drive roller 68 and track surface 45e are brought in contact with each other without providing an oil film. In addition, traction drive or friction drive systems may also be employed in the drive apparatuses of other embodiments to be described later.

In the drive apparatus having the constitution described above, when motor 66 operates with workpiece 70, etc., placed and fastened on table 34 as indicated in FIG. 5, drive roller 68 rolls over track surface 45e. Accordingly, table 43 moves either back or forth in the manner indicated with arrow L together with each slide unit 47 that supports said table 43. The desired processing, such as cutting and so on, is then performed on workpiece 70, etc., accompanying this movement.

Figure 9:
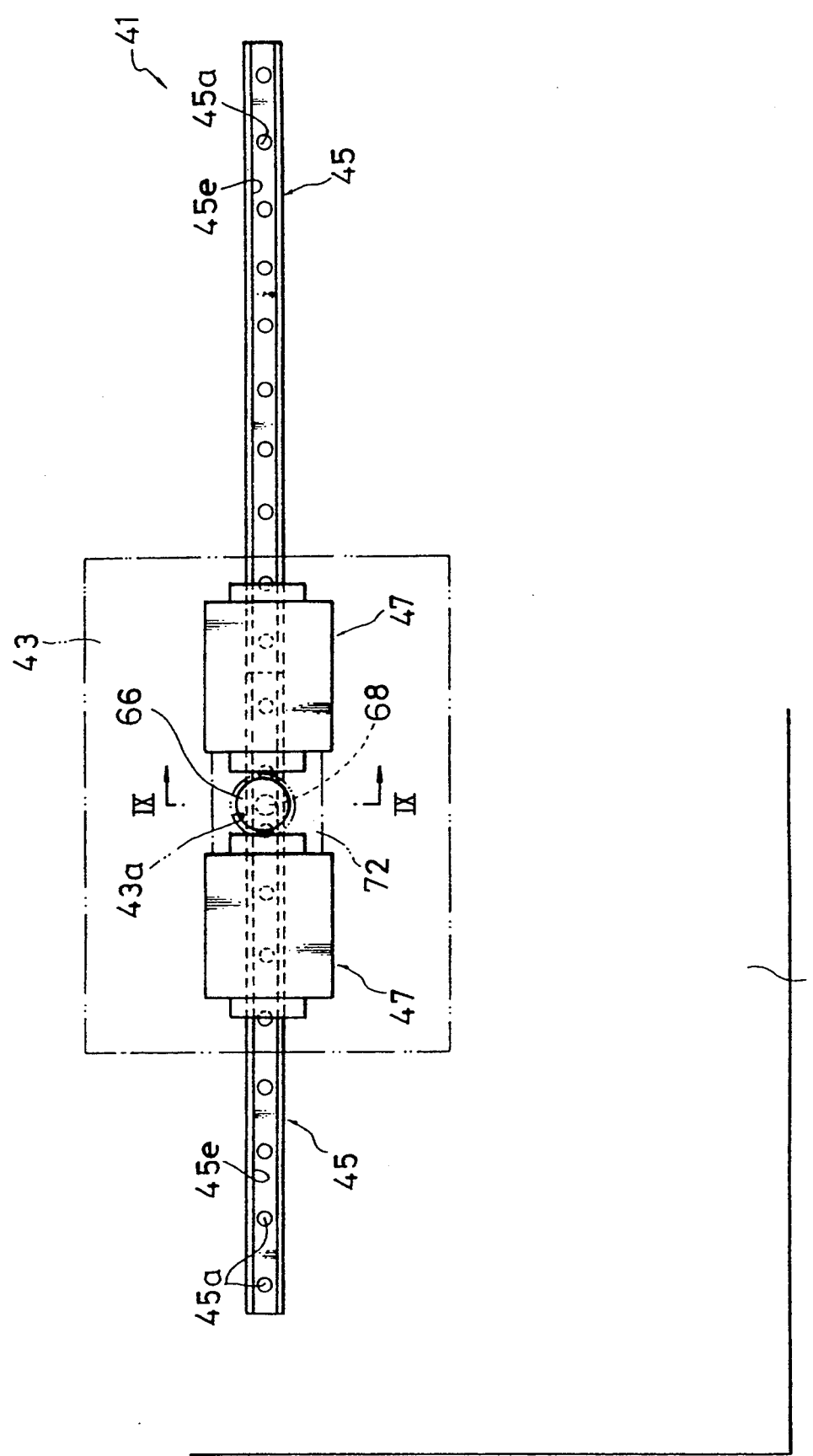
FIG. 9 is an overhead view indicating the drive apparatus of a second embodiment of the present invention mounted on the bed of a machine tool.
Figure 10:
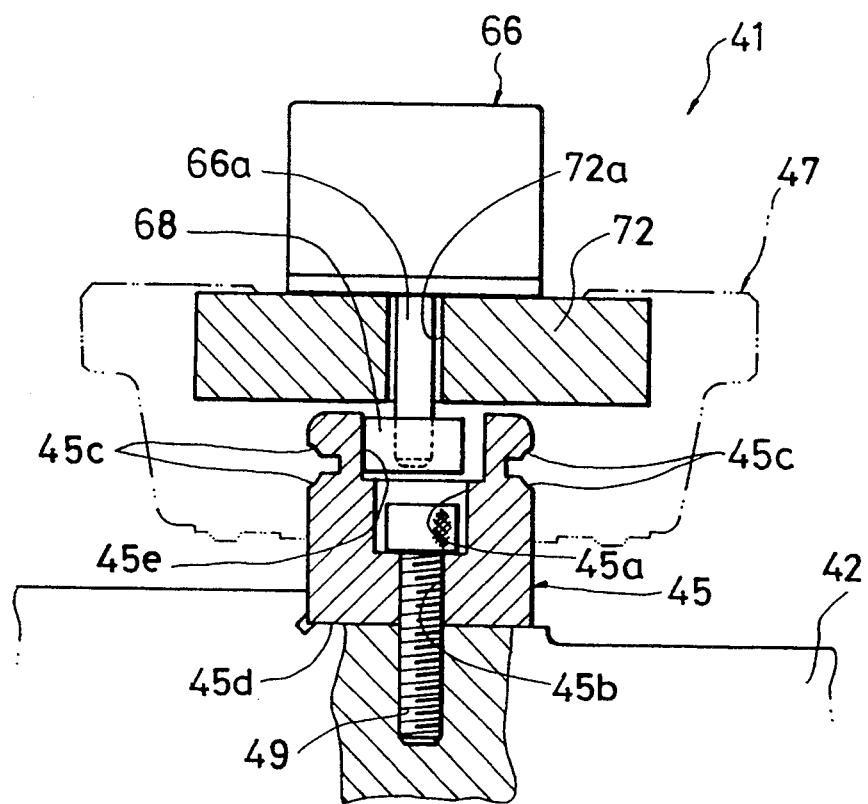
FIG. 10 is a cross-sectional view taken along arrows IX—IX relating to FIG. 9.

FIGS. 9 and 10 indicate the essential components of the drive apparatus of a second embodiment of the present invention. Furthermore, since the drive apparatus pertaining to this second embodiment is composed similar to the drive apparatus of the first embodiment indicated in FIGS. 4 through 8 with the exception of the essential components explained below, an explanation of this entire drive apparatus has been omitted. In addition, in the explanation provided below, the same reference numerals are used for those members that are either identical or correspond to constituent members of the drive apparatus of the first embodiment. Moreover, this applies similarly with respect to explanations of other embodiments to follow.

As indicated in FIGS. 9 and 10 of the subject drive apparatus, a plurality of slide units 47,47 in the form of two sliders arranged in a row in this case, are coupled into a single unit by coupling member 72 roughly in the shape of a flat plate. Motor 66 is mounted on the upper surface of this coupling member 72, and output shaft 66a of said motor 66 is inserted into through hole 72a formed in said coupling member 72.

Figure 11:
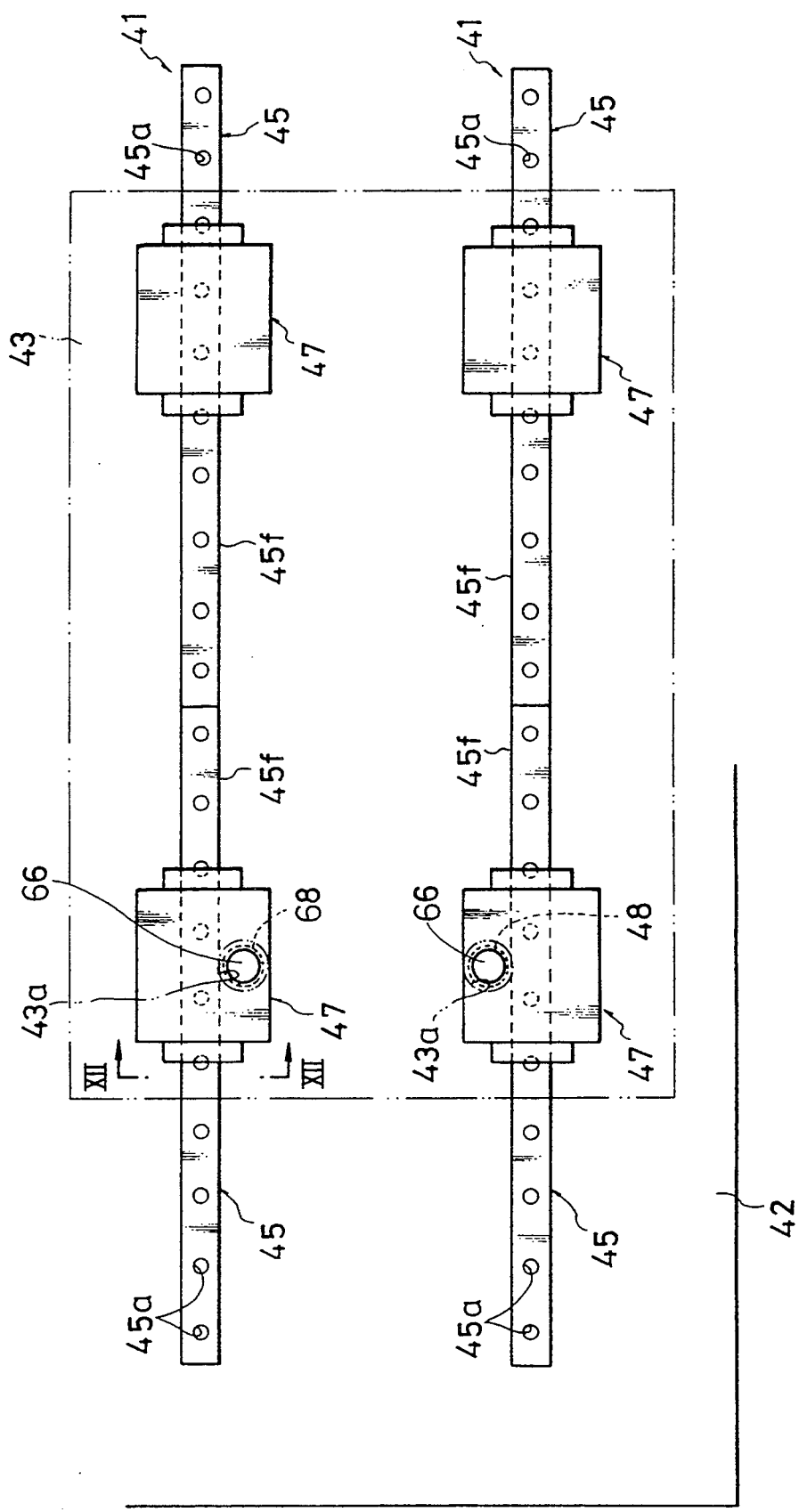
FIG. 11 is an overhead view indicating the drive apparatus of a third embodiment of the present invention mounted on the bed of a machine tool.
Figure 12:
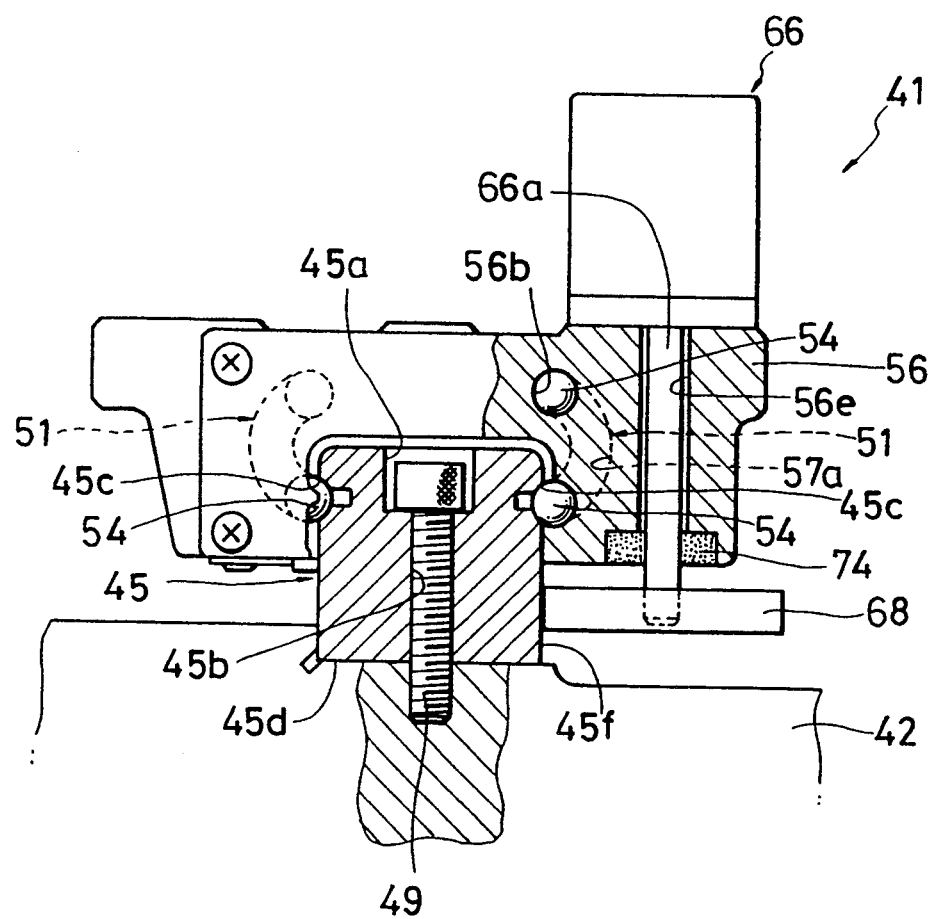
FIG. 12 is a view taken along arrows XII—XII, including a partial cross-section, relating to FIG. 11.

FIGS. 11 and 12 indicate the essential components of the drive apparatus of a third embodiment of the present invention. As indicated in the drawings of the subject drive apparatus, motor 66, serving as a torque generation device, is provided on one side of the upper surface of casing 56 of slide unit 47 so that its output shaft 66a is perpendicular to mounting surface 45d of track rail 45. Drive roller 68, fit onto the end of said output shaft 66a, rolls along side surface 45f of track rail 45 while engaging with said side surface 45f. Furthermore, output shaft 66a is supported in the vicinity of its end by casing 56 of slide unit 47 by means of bearing 74 consisting of a ball bearing, oil-less bearing and so on. As a result of using side surface 45f of track rail 45 as the rolling surface in this manner, the groove provided in track rail 45 to provide track surface 45e in the drive apparatus of the above-mentioned first and second embodiments is no longer required, thus offering the advantage of allowing an ordinary track rail to be used for rolling without modification.

Figure 13:
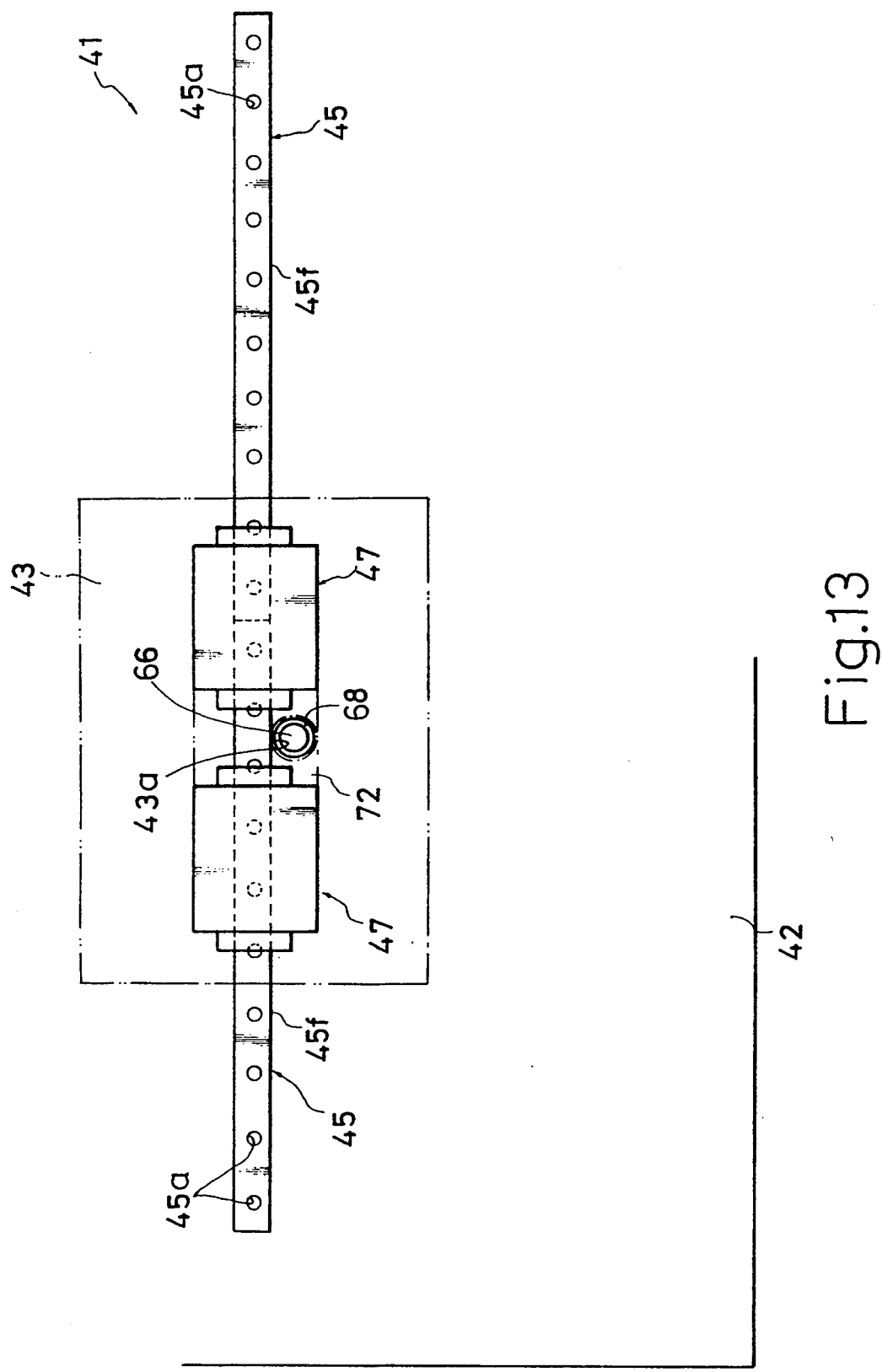
FIG. 13 is an overhead view indicating the drive apparatus of a fourth embodiment of the present invention mounted on the bed of a machine tool.

FIG. 13 indicates the essential components of the drive apparatus of a fourth embodiment of the present invention. As is clear from said drawing of the subject drive apparatus, motor 66 is arranged in the same manner as the drive apparatus of the third embodiment indicated in FIGS. 11 and 12 on one side of the upper surface of a flat, plate-shaped coupling member 72 that mutually connects two slide units 47, arranged in a row on track rail 45, into a single unit. Drive roller 68, fit onto the output shaft of said motor 66, then engages with side surface 45f of track rail 45.

Figure 14:
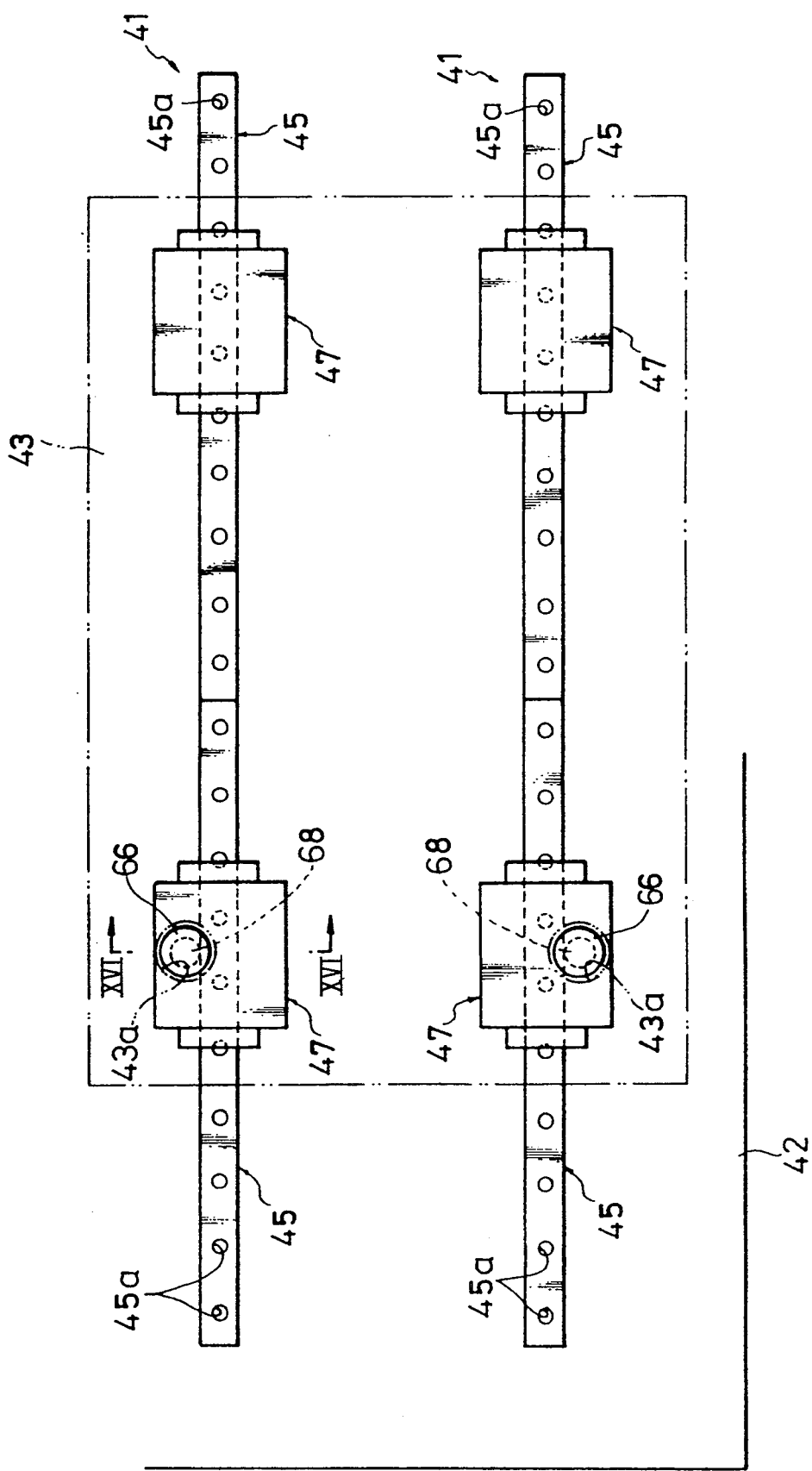
FIG. 14 is an overhead view indicating the drive apparatus of a fifth embodiment of the present invention mounted on the bed of machine tool.
Figure 15:
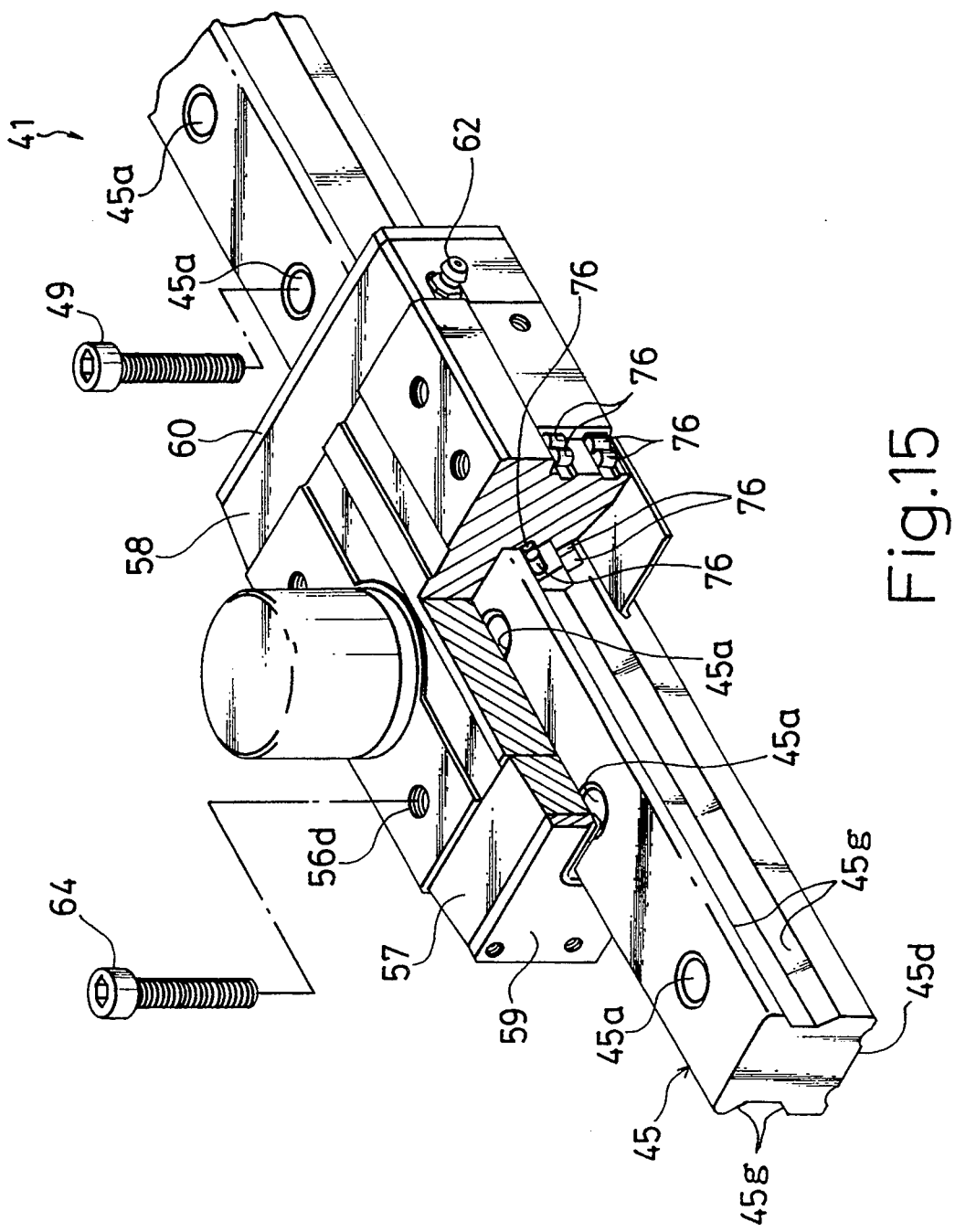
FIG. 15 is a perspective view, containing a partial cross-section, of the essential components of the drive apparatus indicated in FIG. 14.
Figure 16:
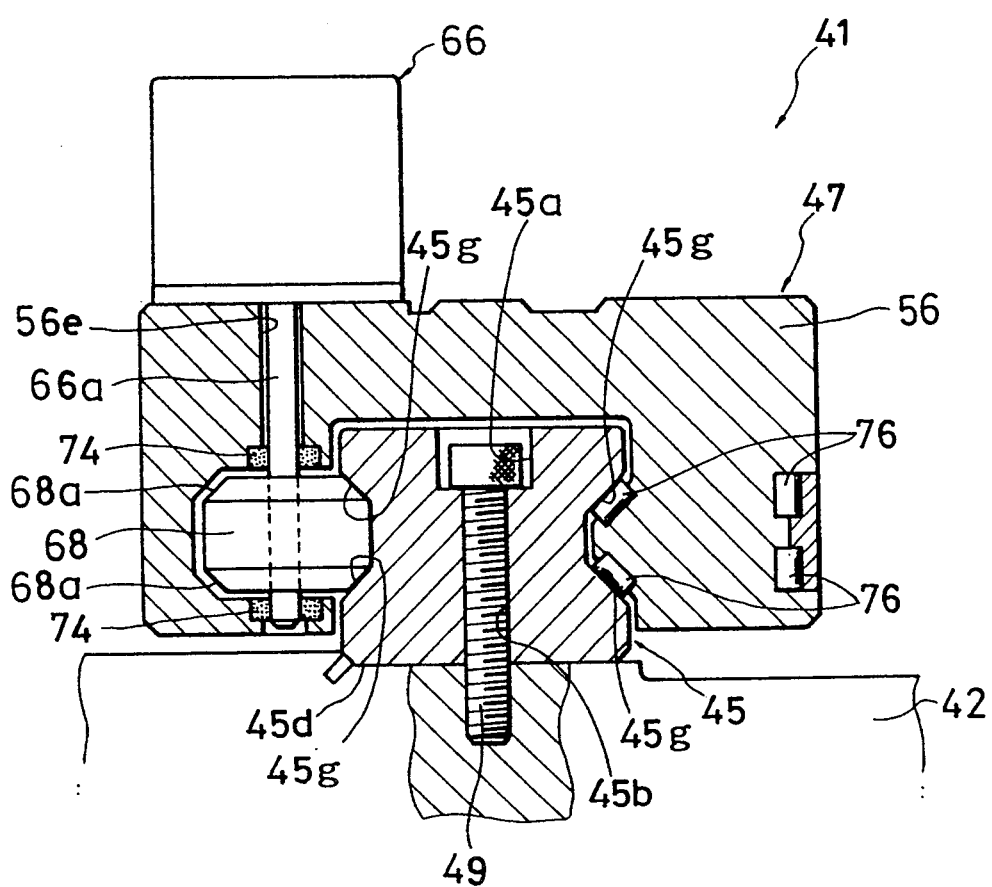
FIG. 16 is a cross-sectional view taken along arrows XVI—XVI relating to FIG. 14.

FIGS. 14 through 16 indicate the essential components of the drive apparatus of a fifth embodiment of the present invention. As indicated in these drawings of the subject drive apparatus, the rolling elements contained within slide unit 47 are cylindrical rollers 76. Accordingly, since these rollers perform rolling, track surfaces 45g formed in track rail 45 are in the form of flat surfaces. A total of four of these track surfaces 45g are formed, with two each located on both sides of track rail 45.

On the other hand, there are two circulating paths, formed in slide unit 47 to allow circulation of rollers 76, formed only in one side of said slide unit 47. Motor 66 is arranged on the upper surface of the other side of slide unit 47 so as to be facing downward. Drive roller 68, fit onto output shaft 66a of said motor 66, has tapered surfaces 68a on its upper and lower ends. Drive roller 68 then engages with one side of track surfaces 45g of track rail 45 by means of these tapered surfaces 68a. Furthermore, output shaft 66a of motor 66 is supported by casing 56 of slide unit 47 by means of bearings 74, comprising ball bearings, oil-less bearings and so on, at two locations on both sides of drive roller 68.

More specifically, only two track surfaces 45g on one side of track rail 45 are used for rolling of rollers 76 as opposed to normally using four said track surfaces 45g. The other two track surfaces 45g are used for the track surfaces of drive roller 68. As a result of this type of composition as well, ordinary track rails can be used as is without forming any special track surfaces for drive roller 68. However, as indicated in FIG. 14, the subject composition applied in the case of using two sets of drive apparatuses 41 in parallel. In addition, as indicated in FIG. 16 of the subject apparatus, as a result of drive roller 68 having two tapered surfaces 68a, a large amount of thrust can be obtained since said drive roller 68 engages with two track surfaces 45g.

Figure 17:
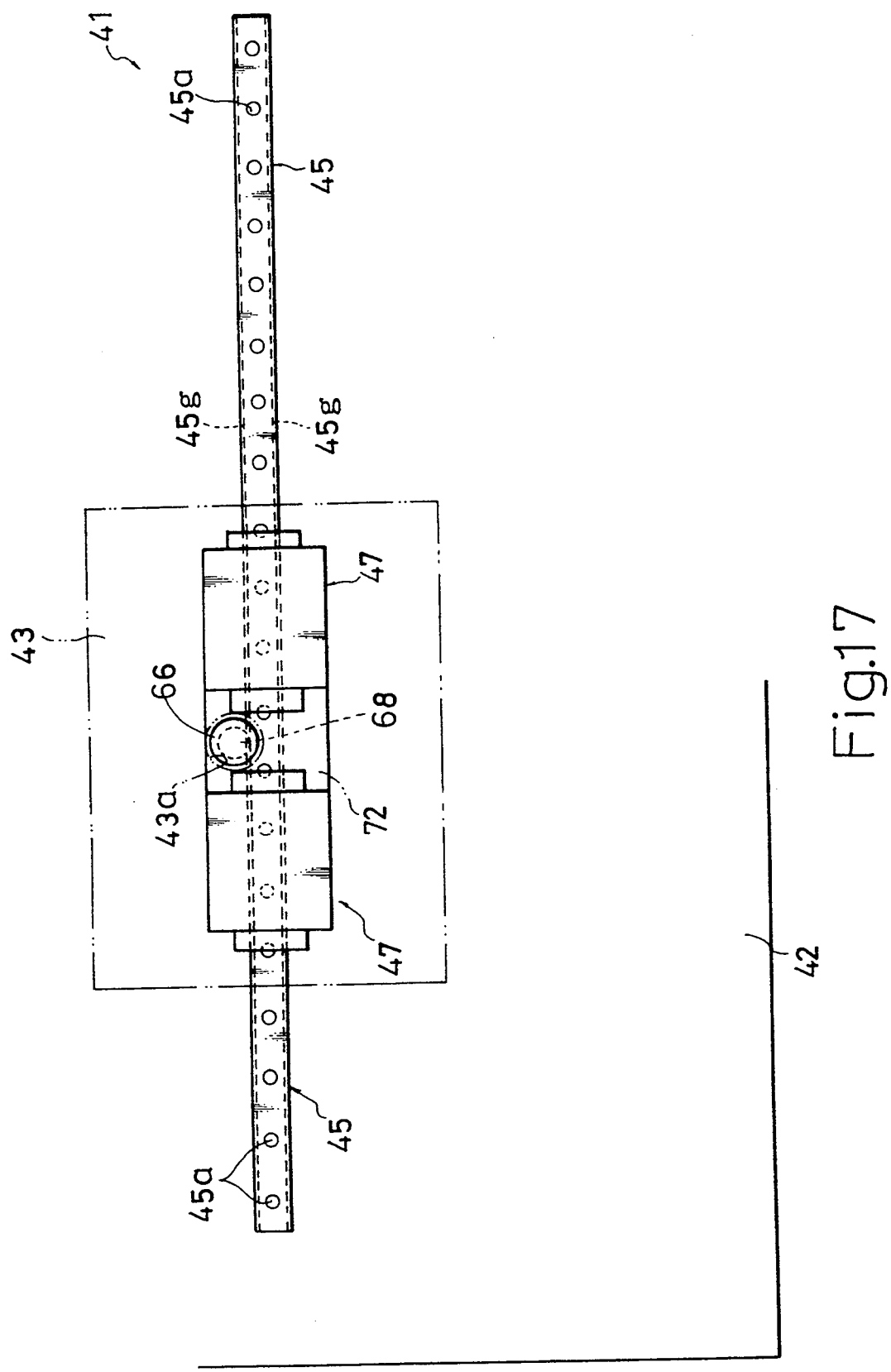
FIG. 17 is an overhead view indicating the drive apparatus of a sixth embodiment of the present invention mounted on the bed of a machine tool.

FIG. 17 indicates the essential components of the drive apparatus of a sixth embodiment of the present invention. As is clear from said drawing of the subject drive apparatus, motor 66 is arranged in the same manner as the drive apparatus of the fifth embodiment indicated in FIGS. 14 through 16 on the side of the upper surface of a flat, plate-shaped coupling member 72 that connects two slide units 47, arranged in a row on track rail 45, into a single unit. Drive roller 68, fit onto the output shaft of said motor 66, then engages with track surfaces 45g on one side of track rail 45.

In the subject composition, the following advantages can be obtained in addition to the advantages offered by the drive apparatus of the above-mentioned fifth embodiment.

In other words, since motor 66 and drive roller 68 are arranged at a location away from each slide unit 47, slide unit 47 can be equipped with circulating paths of rollers 76 on both sides. Accordingly, it can be used with only one set of drive apparatuses 41 as indicated in FIG. 17.

Furthermore, in the drive apparatuses of the above-mentioned fifth and sixth embodiments, although the outside surface of drive roller 68 is of a form that fits into the concave portion formed in track rail 45 to provide track surfaces 45g, conversely, a composition is possible wherein drive roller 68 is given a concave shape and track rail 45 is given a convex shape to allow both components to fit together.

Figure 18:
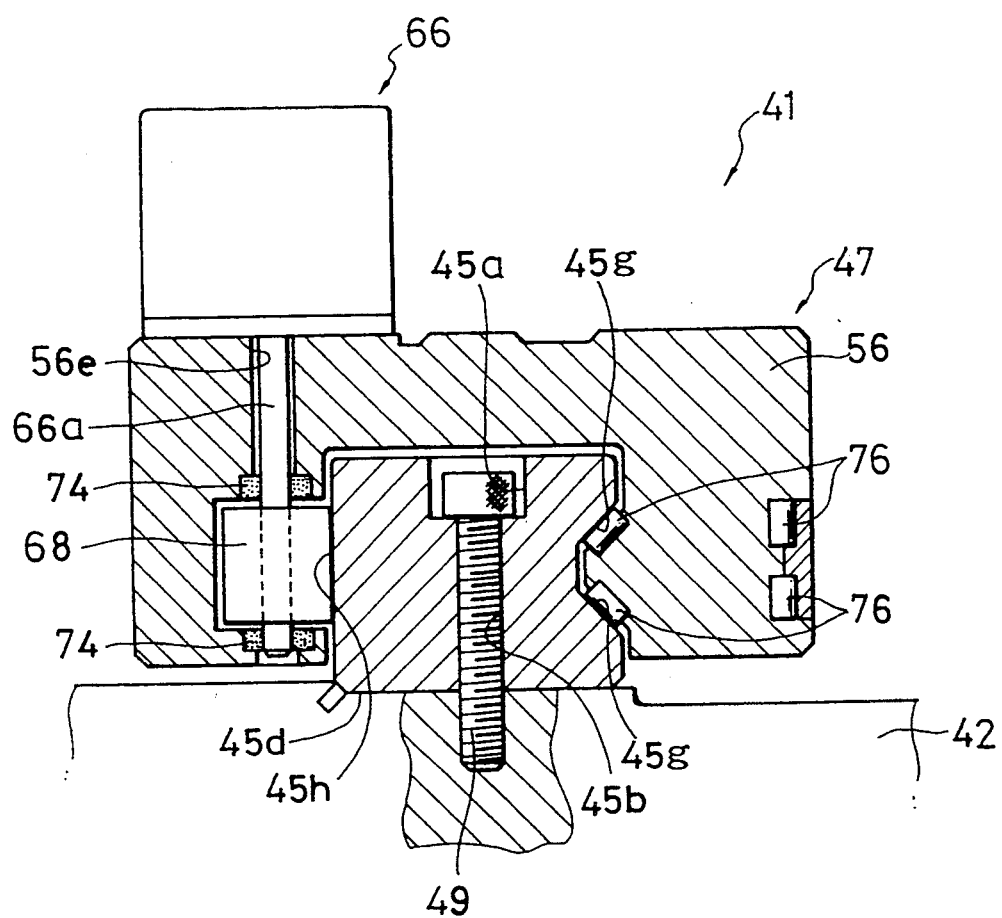
FIG. 18 is vertical cross-sectional view of the essential components of the drive apparatus of a seventh embodiment of the present invention.

FIG. 18 indicates the essential components of the drive apparatus of a seventh embodiment of the present invention. As indicated in this drawing of the subject drive apparatus, one side surface 45h of track rail 45 is formed into a flat surface, and drive roller 68, that engages with said side surface 45h, is formed into a cylindrical shape. However, aside from the above, the composition is the same as that of the drive apparatuses of the fifth and sixth embodiments indicated in FIGS. 14 through 17.

Furthermore, in each of the above-mentioned embodiments, although each drive apparatus 41 is equipped with one motor 66 and one drive roller 68 each, there are no limitations on the number of these constituents.

In addition, it goes without saying that the present invention is not limited to the above-mentioned first through seventh embodiments, but can realize a diverse range of constitutions by suitably combining the constitutions of two or more of each of these embodiments.

In addition, in each of the above-mentioned embodiments, although balls 54 and rollers 76 circulate within slide unit 47 accompanying movement of said slide unit 47, said embodiments are not limited to said constitution, but other constitutions may naturally be applied as well.

Moreover, although the case of using motor 66 for the torque generation device is indicated in each of the above-mentioned embodiments, various other torque generation devices, such as that combining a motor and a speed reduction mechanism, can also be applied.

Finally, although drive roller 68 is directly attached to output shaft 66a of motor 66 in each of the above-mentioned embodiments, a constitution may be employed in which drive roller 68 is attached to casing 56, and a speed reduction mechanism, etc., is installed between said drive roller 68 and motor 66.

According to the present invention as described above, since driving of a slider is performed by a torque generation device installed to have a compact form, the present invention offers the first advantage of allowing the overall size of the drive apparatus to be reduced.

In addition, since the above-mentioned driving is only the result of directly engaging a track rail and a drive roller to which torque is applied by the output shaft of a torque generation device, a member for transmitting driving force is not required resulting in reduced costs, thereby offering the second advantage of the present invention.

Moreover, since a driving force transmission member is not provided between the drive roller and track rail as indicated above, in comparison with apparatuses of the prior art in which driving force is transmitted through numerous driving force transmission members, movement of the driven object and positioning accuracy, which are effected by the number of components and manufacturing accuracy, is dramatically improved thereby resulting in the third advantage of the present invention.

In addition, since the total weight of moving components consisting of the slider and torque generation device is small, together with it being easy for the drive apparatus of the present invention to achieve high-speed driving, since the number of components operating relative to each other is also low, the present invention offers the fourth advantage of allowing suppression of the level of noise.

What is claimed is:

1. A drive apparatus comprising at least one elongated track rail mounted on a support, drive track means formed on and extending lengthwise of said rail, slider means mounted on said rail for movement lengthwise of said rail, torque generation means mounted on said slider means and having an output shaft disposed orthogonal to said rail, a drive roller secured to said shaft and disposed in engagement with said track means for driving said slider means lengthwise of said rail and roller bearing means disposed between said slider means and said rail for maintaining said drive roller in engagement with said rail without substantially increasing friction between said drive roller and said rail.

2. The drive apparatus of claim 1, wherein an oil film is formed between said rail and said drive roller.

3. The drive apparatus of claim 1, wherein said drive track means is comprised of a groove formed in the top of said rail having spaced apart parallel surfaces.

4. The drive apparatus of claim 3, wherein said drive roller engages one of said surfaces.

5. The drive apparatus of claim 1, wherein said drive roller rolls over side surface of said rail.

6. The drive apparatus of claim 1, wherein said slider means has a supporting surface to hold a prescribed object on the side opposite that of said rail and said torque generation means is mounted on said supporting surface.

7. The drive apparatus of claim 1, wherein said slider means is comprised of a plurality of sliders provided on said rail, each of said sliders being coupled together into a single unit with said torque generation means and said drive roller disposed between adjacent sliders.

8. The drive apparatus of claim 1, wherein said rail has a mounting surface to attach it to a frame so that the output shaft of said torque generation device is perpendicular with respect to said mounting surface.

9. The drive apparatus of claim 1, wherein said torque generation means is a motor.

10. A drive apparatus comprising at least one elongated track rail mounted on a support, drive track means formed on and extending lengthwise of said rail, torque generation means mounted on said slider means and having an output shaft disposed orthogonal to said rail, a drive roller secured to said shaft and disposed in engagement with said track means for driving said slider means lengthwise of said rail and bearing means disposed between said slider means and said rail for maintaining said drive roller in engagement with said rail, wherein said drive track means is comprised of a groove formed in the top of said rail having spaced apart parallel surfaces.

11. The drive apparatus of claim 10, wherein said drive roller engages one of said surfaces.

12. A drive apparatus comprising at least one elongated track rail mounted on a support, drive track means formed on and extending lengthwise of said rail, slider means mounted on said rail for movement lengthwise of said rail, torque generation means mounted on said slider means and having an output shaft disposed orthogonal to said rail, a drive roller secured to said shaft and disposed in engagement with said track means for driving said slider means lengthwise of said rail and bearing means disposed between said slider means and said rail for maintaining said drive roller in engagement with said rail, wherein said slider means is comprised of a plurality of sliders provided on said rail, each of said sliders being coupled together into a single unit with said torque generation means and said drive roller disposed between adjacent sliders.

13. The drive apparatus of claim 10, wherein said drive roller rolls over only one side surface of said rail.

* * * * *